Jan. 27, 1931.  J. SACHS  1,790,323
SYSTEM OF MANUFACTURE FOR ELECTRIC SWITCHES
Filed Jan. 28, 1928  4 Sheets-Sheet 1

Inventor
Joseph Sachs
By S. Jay Teller
Attorney

Patented Jan. 27, 1931

1,790,323

UNITED STATES PATENT OFFICE

JOSEPH SACHS, OF WEST HARTFORD, CONNECTICUT

SYSTEM OF MANUFACTURE FOR ELECTRIC SWITCHES

Application filed January 28, 1928. Serial No. 250,305.

The general object of the present invention is to provide a system of manufacture for electric switches which makes it possible for a variety of structurally and functionally different switches to be constructed in the main from similar or common parts, the number of parts which differ according to the type of switch being reduced to a minimum. Stated more specifically the principal object of the invention is to provide a system of manufacture which makes it possible with a minimum number of parts to construct a simple fused switch of the general type disclosed in my patent for electric circuit controlling appliances, No. 1,754,445, issued April 15, 1930, or a fused meter testing switch of the general type disclosed in my copending application for electric meter service appliance, Serial No. 247,730, filed January 18, 1928, or a fused meter testing switch of the general type set forth in my patent for electric meter service appliances No. 1,757,743, issued May 6, 1930.

In the accompanying drawings forming a part of this specification I have shown three types of fused switches, such as above specified, constructed in the main from common parts and from a small number of parts which are not common, but it will be understood that the drawings are for illustrative purposes only and that I do not limit myself to the precise forms of switches as illustrated. The drawings are not to be construed as defining or limiting the scope of the invention, the claims forming a part of this specification being relied upon for that purpose.

Figures 1, 2, 3:
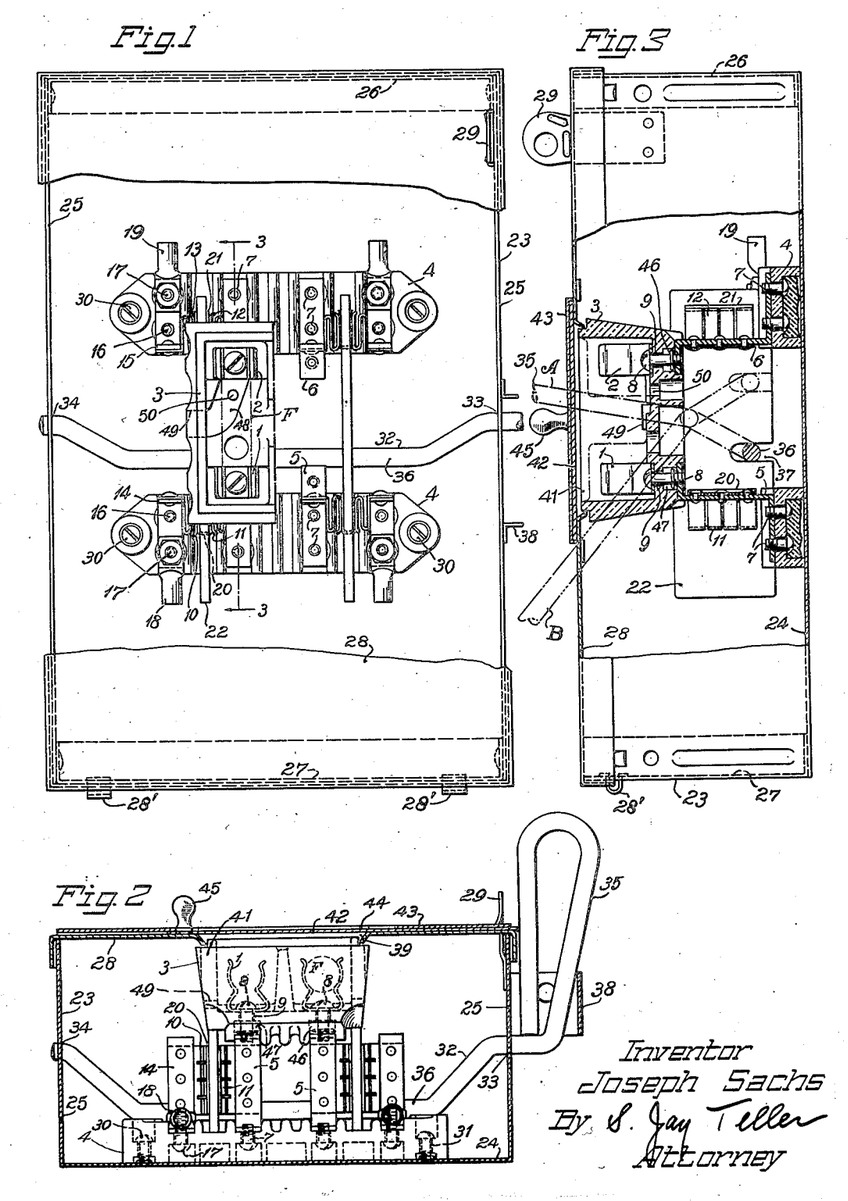
Fig. 1 is a front view of an enclosed fused switch embodying the invention, certain parts being broken away in order that other parts may be more clearly shown.
Fig. 2 is a bottom view of the fused switch as shown in Fig. 1, the enclosing cabinet being shown in section.
Fig. 3 is a combined side and vertical sectional view of the enclosed fused switch as shown in Fig. 1, the section being taken along the line 3—3 of Fig. 1.

In Figs. 1 to 3 I have shown a fused switch of the type disclosed in my aforesaid Patent No. 1,754,445, this switch being without facilities for meter testing. The switch as shown comprises two pairs of fuse contacts and two separate switching devices, but it will be understood that the invention is not necessarily limited to any particular number of fuses and switches. The fuse and switch contacts are shown symmetrically disposed with respect to the vertical central plane of the appliance, and for the sake of convenience and simplicity of description, I will describe in detail only those parts on one side of the said plane, it being understood that the parts on the other side are, or may be, the same in construction except for reversal of positions.

Fuse receiving contacts 1 and 2 are provided on the front face of an insulating base 3. The fuse contacts as shown are adapted for receiving a cartridge enclosed fuse such as F, but it will be understood that the invention is not limited for use with fuses of this particular type. In addition to the main rear support, which may be the rear wall of an enclosing cabinet, I provide an independent insulating supporting device which is ordinarily secured to the main rear support but which is nevertheless separate therefrom. This supporting device is shown at 4, 4 in the drawings and may comprise two separated bars of insulating material. A plurality of supporting elements 5 and 6 are provided which are connected at their rear portions with the supporting device bars 4, 4, and at their forward portions with the base 3. The elements 5 and 6 therefore serve to support the base in the normally fixed spaced relationship with the said rear supporting device. The supporting elements 5 and 6 are shown as being Z-shaped, but as to this there may be variation. The supporting elements have their rear portions connected with the supporting device bars 4, 4 by means of screws 7, 7. Suitable means such as screws 8, 8 are provided for mechanically connecting the forward portions of the supporting elements with the fuse base 3, the screws extending through holes 9, 9 in the said base. These screws 8, 8 preferably also serve to hold the fuse contacts 1 and 2 in place and to electrically connect the said fuse contacts with the respective supporting elements.

Located at least in part in the space behind a vertical plane extending through the rear parts of the base 3 is a switching device. As concerns some of the broader phases of the invention, the construction and mounting of the switching device can be varied, but, preferably and in accordance with other phases of the invention, the switching device comprises two pairs of stationary switch contacts and movable conducting elements for making and breaking electrical connection between the contacts of the said pairs. As shown there are two pairs of contacts 10, 11 and 12, 13, the contacts of each pair being similar to each other but oppositely positioned. The contacts 11 and 12 are mounted directly upon and electrically connected respectively with the corresponding supporting elements 5 and 6 which elements are electrically connected respectively with the fuse contacts 1 and 2. Contact supporting elements 14 and 15 are provided for the contacts 10 and 13, these preferably being somewhat similar to the main supporting elements 5 and 6 and being similarly secured to the supporting device bars 4, 4 as by screws 16, 16 and 17, 17. The supporting elements 14 and 15 differ from the supporting elements 5 and 6 in that they terminate at the front at or near the front edges of the switch contacts, thus being adapted to support only the said contacts. Connected with each of the two supporting elements 14 and 15 are wire connecting terminals 18 and 19. I have shown terminals of the solder lug type, but I do not so limit myself.

For establishing or breaking electrical connection between the switch contacts of the said pairs 10, 11 and 12, 13, I provide for each pair a switching element which is rectilinearly movable substantially parallelly with the front faces of the supporting device bars and with the rear face of the fuse base. When there are two pairs of stationary switch contacts there are two conducting switching elements 20 and 21 insulated from each other and adapted respectively to engage and disengage the said stationary switch contacts. The two conducting switching elements 20 and 21 are preferably carried by an insulating element 22, which with the said conducting elements constitutes a rectilinearly movable switching member. The insulating element 22 is preferably in the form of flat plate, the said conducting elements 20 and 21 extending through it and projecting somewhat beyond the opposed surfaces thereof as shown. The details of the switching member may be as shown in my patent for electric circuit controlling appliance, No. 1,754,443, issued April 15, 1930.

From the foregoing description, it will be apparent that when the switching member is in the "on" position as shown, a circuit will be established from the wire connecting terminal 16 through the contact supporting element 14 and the switch contacts 10, 20 and 11, to the supporting element 5 and thence to the fuse contact 1. Similarly a connection is established from the fuse contact 2 through the supporting element 6 and the switch contacts 12, 21 and 13 to the contact supporting element 15 and the wire terminal 19. When the switching member is moved upward from the position shown, the elements 20 and 21 will be disengaged from the stationary switch contacts and circuit will be broken at two points at each side of the fuse, thus making a total of four breaks. Although the switching member is guided between the base 3 and the supporting device bars 4, 4 and is held by these parts against forward or backward movement, it is entirely free to adjust itself laterally to conform to the positions of the several stationary switch contacts.

As shown the several stationary switch contacts are located respectively above and below the upper and lower rear edges of the fuse base so as to be clearly visible and easily accessible from the front of the appliance.

I have shown an enclosing cabinet 23 of sheet metal having a rear wall 24, side walls 25, 25 and end walls 26 and 27. It may be preferable to construct one or both of the end walls 26 and 27 so as to permit easy removability. I have shown removable end walls constructed in accordance with the disclosure in my Patent No. 1,458,728 dated June 12, 1923. The cabinet has an openable front cover 28, which is shown as being hinged at 28' to the bottom end wall 27. Suitable means such as a spring latch 29 is provided for holding the cover in closed position and a seal may be connected with the latch for preventing the opening of the cover except by breaking the seal. The fused switch unit as a whole is secured to the rear wall 24 of the cabinet by means of screws 30, 30 extending through holes 31, 31 in the supporting device bars 4, 4 and into suitable threaded holes in the said rear wall of the cabinet.

For operating the switch members there is provided a spindle 32 consisting of a rod which includes two pivot sections 33 and 34 extending through bearing openings in the side walls 25, 25 of the cabinet. The said rod is bent to form a manually operable handle 35 outside of the cabinet and also to form a crank section 36 inside of the cabinet and between the pivot sections. In each insulating element 22 there is a slot 37 adapted to receive the crank section 36. The slot 37 is preferably open at one end, that is, at the back end, so as to facilitate assembly or disassembly of the fused switch unit to or from the cabinet. The slot 37 is shown as being near the middle of the insulating element, this location being ordinarily preferable, but it will be understood that I do not limit myself to this location. Preferably, the cabinet is provided with a handle stop member 38. By moving the handle 35 each of the switch members can be moved longitudinally upward or downward, as desired. With the handle 35 in its uppermost position A as shown in Fig. 3, the switching members will be held in their lowermost positions thus completing the circuit through the switch and fuse contacts as described. When the handle 35 is moved to its lowermost position B as shown in Fig. 3, the switching members will be moved to their uppermost positions, thus separating the movable contacts 20 and 21 from the stationary contacts 10, 11 and 12, 13 respectively and thus breaking each leg of the circuit at four points as already fully described.

The cabinet cover 27 may be provided with an opening 39 through which the said fuses and contacts are accessible. When such an opening is provided the relationship between the cover and fuse base 3 is such that a wall or an extension 41 on the base serves to entirely close the opening 39 when the cover is in closed position. The said wall or extension 41 encloses the fuses on four sides and prevents access through the opening 39 to any parts within the cabinet other than the said fuses and fuse contacts. I preferably provide an auxiliary fuse cover for the opening 39 and it may be desirable to so construct the parts that the fuse cover cannot be opened when the switch handle 35 is in the position corresponding to the closed position of the switch and so that the handle 35 cannot be moved to the position corresponding to the closed position of the switch when the cover is open. I have shown such an interlocked fuse cover, this being a sidewise opening flat cover 42 preferably directly engaging the main cover 28 for sliding movement thereon. Rigidly secured to the main cover 28 is a sheet metal guide 43 having an opening 44 therein which registers with the opening 39 in the main cover. The guide 43 is spaced from the main cover so that the fuse cover 42 is slidably mounted between the said parts. The said fuse cover 42 is provided with a knob 45 which serves as a means for moving the fuse cover and which also serves as a stop for limiting the movement of the said cover in either direction. Fig. 2 shows the cover 42 in its left hand closed position. It will be observed that when the fuse cover is in closed position and the handle 35 in the switch closing position, the said handle directly obstructs the cover and prevents the opening movement thereof. When the fuse cover is in its open position having been moved to the right from the position shown in Fig. 2, the said cover directly obstructs the handle 35 and prevents its movement to switch closing position.

As already stated the base 3 is held in place on the supporting elements 5 and 6 by means of screws 8, 8. Obviously, therefore, the base is easily removable to prevent access to the switch parts or to permit the rectilinearly movable switching members to be removed, all as fully set forth in my aforesaid Patent No. 1,754,445. Preferably in order that the contacts 1 and 2 may be retained upon the fuse base 3 when the base is detached, each of the screws 8 carries a washer 46 located in a recess 47 in the base. It will be obvious that as the screw 8 is withdrawn from the supporting element the washer 46 will move forward in the recess 47, but that the washer will engage the front surface of the recess to prevent complete withdrawal of the screw, thus holding the fuse contact in place on the base.

The base 3, in addition to the features already described, has therein at each side thereof a groove 48 which communicates with a lateral opening 49 through the wall or extension 41. A screw hole 50 extends through the base and communicates with the groove 48.

Figure 4:
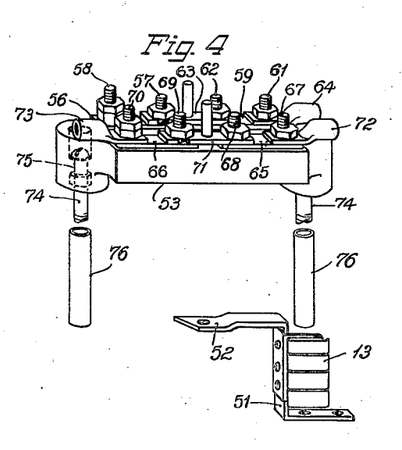
Fig. 4 is a perspective view showing certain additional and substitute parts adapted to be combined with the parts shown in Figs. 1 to 3 to produce a switch of a different type.

The appliance as shown in Figs. 1 to 3 and as thus far described is a simple fused switch of general utility and not particularly intended or adapted for use in conjunction with an electric meter. In accordance with the present invention I am enabled to construct a meter service switch utilizing most of the parts shown in Figs. 1 to 3 in combination with certain added and substitute parts. In Fig. 4 I have shown the additional and substitute parts required to construct a fused meter testing switch of the "link" type, as shown in the said application Serial No. 247,730, it being understood that the parts shown in Fig. 4 are those to be added and substituted at the left and that similar parts are to be also added and substituted at the right. The complete fused meter testing switch of the "link" type is shown in Figs. 6 to 8, this including all of the parts shown in Figs. 1 to 3 and already described, with the exception of the supporting elements 15, 15, the terminals 19, 19, the screws 30, 30 and the cabinet end wall 26.

Figure 6:
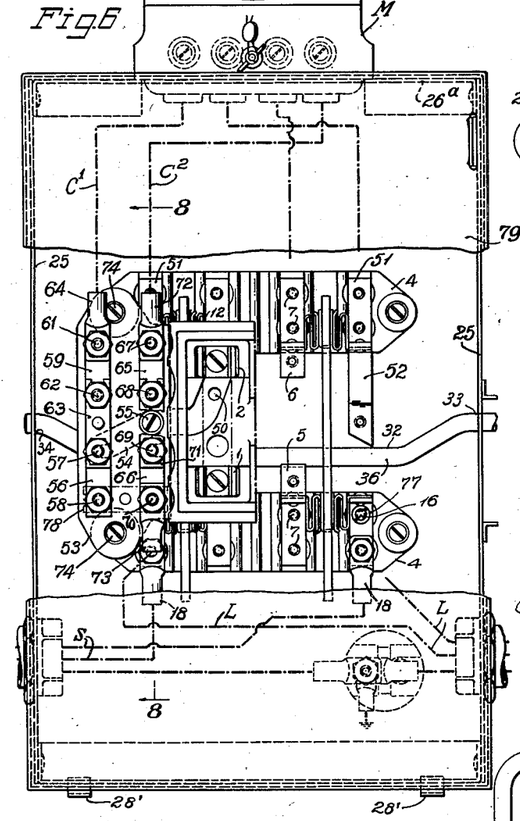
Fig. 6 is a front view similar to Fig. 1 but showing an enclosed fused meter testing switch, constructed by combining the parts shown in Fig. 4 with some of the parts shown in Figs. 1 to 3.
Figure 7:
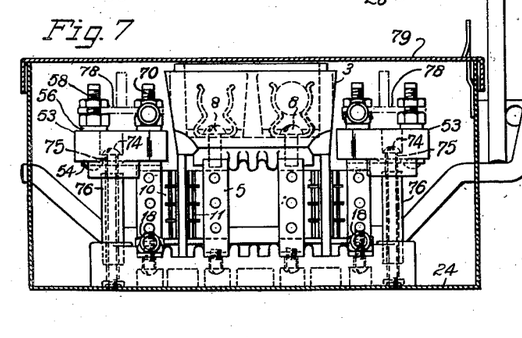
Fig. 7 is a bottom view of the fused meter testing switch as shown in Fig. 6, the enclosing cabinet being shown in section.
Figure 8:
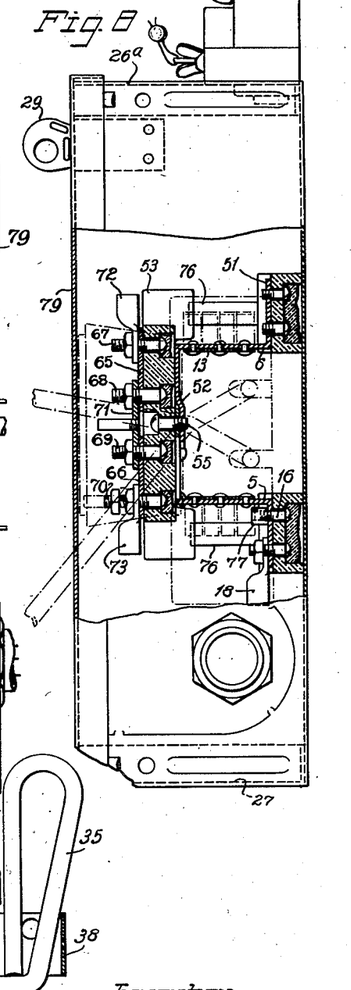
Fig. 8 is a combined side and vertical sectional view of the enclosed fused meter testing switch as shown in Fig. 7, the section being taken along the line 8—8 of Fig. 6.
Figure 9:
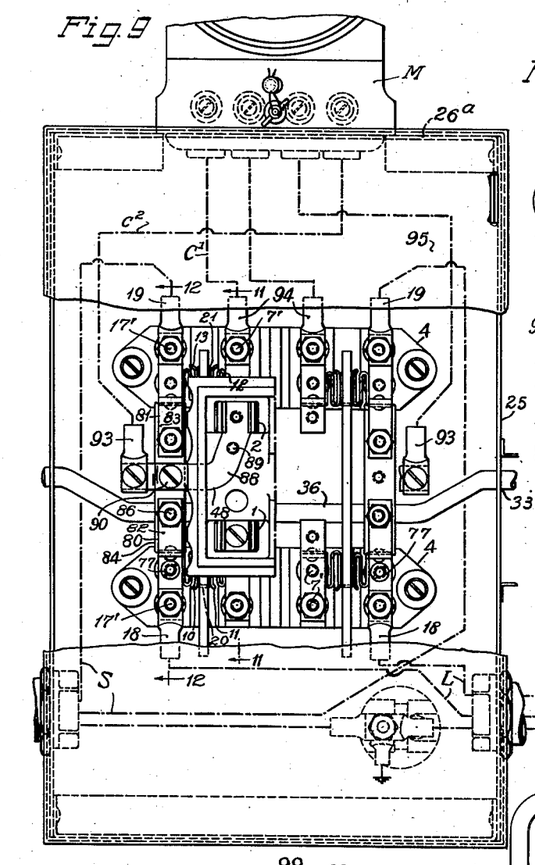
Fig. 9 is a front view similar to Fig. 1 but showing an enclosed meter testing switch of a different type, constructed by combining the parts shown in Fig. 5 with some of the parts shown in Figs. 1 to 3.
Figure 10:
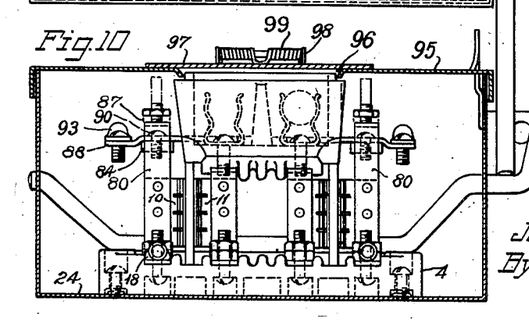
Fig. 10 is a bottom view of the fused meter testing switch as shown in Fig. 9, the enclosing cabinet being shown in section.
Figure 11:
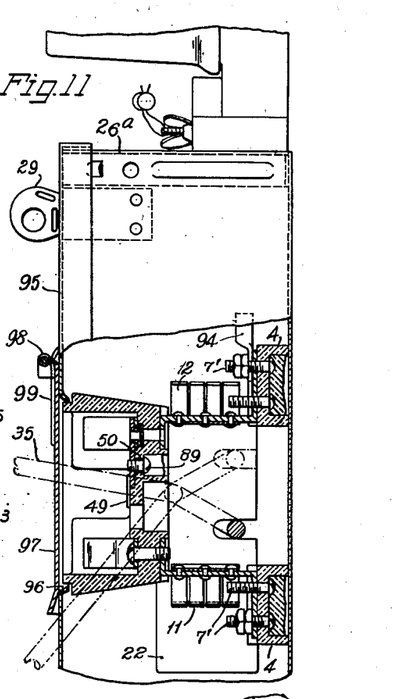
Fig. 11 is a combined side and vertical sectional view of the enclosed fused meter testing switch as shown in Fig. 9, the section being taken along the line 11—11 of Fig. 9.
Figure 12:
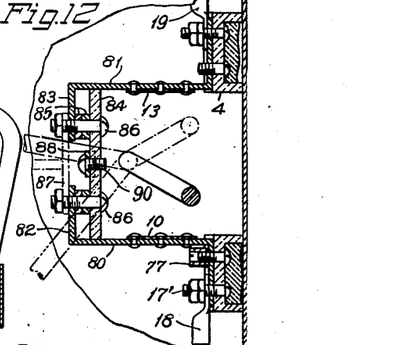
Fig. 12 is a fragmentary vertical sectional view taken along the line 12—12 of Fig. 9.

When a switch such as shown in Figs. 6 to 8 is required I entirely omit the terminals 19, 19 and I provide at each side a substitute supporting element 51 which is identical with the supporting element 15 as concerns the supporting of the switch contact 13 and as concerns its mounting on the supporting bar 4. The two supporting elements 15 and 51 are therefore interchangeably usable and are adapted to be interchangeably mounted on the supporting bar. The element 51 differs from the element 15 in that it is adapted not only to support the switch contact 13 but is also adapted to at least partly support a meter testing means. For this purpose the element 51 is provided with an extension 52 as clearly shown in Figs. 4 and 8.

The meter testing means is of the type disclosed in my aforesaid copending application Serial No. 247,730. The drawings show the meter testing means at the left but it will be understood that a similar meter testing means is provided at the right. Each of the said meter testing means comprises an insulating member or block 53 upon which are mounted certain electrical elements. The details of the electrical elements on the block 53 may be varied but as shown there is provided a transverse or diagonal element 54 which is electrically connected with the extension 52 on the supporting element 51 by means of a screw 55. At the front of the block 53 is a short vertical conductor 56 electrically connected with the element 54 by means of a screw 57 which extends through the block and through both of the said conductors. The conductor 56 is also held by another screw 58. A second conductor 59 is provided at the front of the block 53 in vertical register with the conductor 56, this being held in place by means of screws 61 and 62. The two conductors 56 and 59 are normally connected by means of a detachable test link 63 which is engaged by nuts on the screws 57 and 62. A wire terminal 64 is provided in electrical connection with the conductor 59 and held in place by means of a nut on the screw 61. Near the inner side of the block 53 are other vertical conductors 65 and 66 held in place respectively by screws 67, 68 and 69, 70. A removable test link 71 similar to the test link 63 normally connects the conductors 65 and 66 this test link being held in place by means of nuts on the screws 68 and 69. A wire terminal 72 is connected with the conductor 65 being held in place by a nut on the screw 67 and a wire terminal 73 is connected with the conductor 66 being held in place by a nut on the screw 70.

As already stated the meter testing means is adapted to be at least partly supported by the substitute supporting element 51. In order to provide additional support for the testing means I preferably provide struts adapted to be interposed between the said means and the supporting device and I also provide longer screws 74, 74 which are adapted to be substituted for the screws 30, 30 and which extend not only through the holes 31, 31 in the bars 4, 4 but also through registering holes 75, 75 in the base 53. The aforesaid struts may be varied as to form but I prefer to use tubes 76, 76, preferably of insulating material. These tubes are constructed to extend into the enlarged or countersunk outer portions of the holes 31, 31 in the supporting device bars 4, 4 and also into similar enlargements at the inner ends of the holes 75, 75 in the base 53. It will be seen that the tubes 76, 76 cooperate with the screws 74, 74 to assist in supporting the testing means, the said screws 74 also serving to hold the entire device in place with respect to the supporting wall, that is, with respect to the rear wall 24 of the cabinet.

Ordinarily when a meter testing fused switch is provided as shown in Figs. 6 to 8, it is preferable to mount the meter, such as M, in direct protective relationship with the cabinet. For this purpose I have provided a cabinet end wall 26ᵃ adapted to be substituted for the end wall 26 shown in Fig. 1 to 3. The end wall 26ᵃ is identical with the end wall 26 as concerns its outer contour and its manner of mounting in the cabinet but it differs in that it has an opening therein adapted to receive for protective purposes the terminal portions of the electric meter.

The electric connections are ordinarily made as shown in Fig. 6. The service wires S. S are connected with the terminals 18, 18 and the circuit extends as already described in connection with Figs. 1 to 3 to the supporting elements 51, 51. From each supporting element 51 the connection extends through the conductor 54, the screw 57, the link 63 and the conductor 59 to the terminal 64. A connection C¹ extends from the terminal 64 to the meter and another connection C² extends from the meter to the terminal 72. From the terminal 72 the connection extends through the conductor 65, the link 71 and the conductor 66 to the terminal 63 which is connected with one of the load wires L. If desired nuts 77, 77 may be provided on the screws 16, 16 for the attachment of additional meter connections such as required for six terminal meters.

When the meter is to be tested it is ordinarily desirable to provide a by-pass from the service wires to the load wires so that the customer may not be deprived of service during testing. For this purpose I utilize the aforesaid screws 58 and 70 which are adapted to receive a by-pass link 78 shown by dot-and-dash lines, this link being held in place by additional nuts on the said screws. It will be seen that when a by-pass link 78 is in place at each side the circuit extends, as already described, through the fused switch to the conductor 56 and thence through the link 78 to the terminal 73 and the load wire L. After the by-pass link 78 is in place either or both of the terminals of the meter may be electrically freed by removing either or both of the links 63 and 71. With the links 63 and 71 removed the screws 57, 62, 68 and 69 or some of them may be used, in conjunction with the associated nuts, for the attachment of the usual leads connected with suitable testing instruments.

As already suggested the cabinet for the fused switch as shown in Figs. 6 to 8 may be the same (except for the end wall) as that shown in Figs. 1 to 3. However, it is not necessarily the same as concerns the front cover construction and in order to illustrate the fact that the front cover construction may be varied I have shown a plain front cover 79 having no opening therein permitting access to the fuses. With this construction it is necessary, in order to obtain access to the fuses, to open the main front cover 79, breaking the seal if one has been provided. It will be observed that either of the said cover constructions would serve to prevent theft of current by the customer by means of connections made with the fuse contacts.

Figure 5:
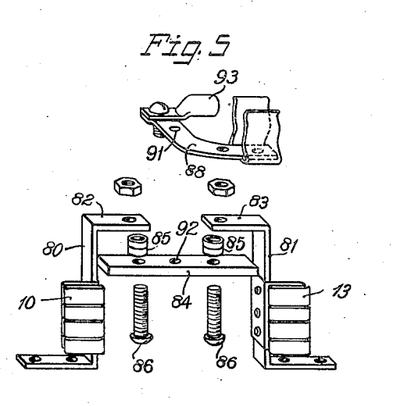
Fig. 5 is a perspective view showing certain other additional and substitute parts adapted to be combined with the parts shown in Figs. 1 to 3 to produce a switch of a still different type.

In Fig. 5 I have shown the principal additional and substitute parts required to be used in conjunction with the parts shown in Figs. 1 to 3 in order to construct a fused meter testing switch of the "linkless" type as shown in the said Patent No. 1,757,743, it being understood that the parts shown in Fig. 5 are to be added and substituted at the left and that similar parts are to be also added and substituted at the right. The complete fused meter testing switch of the linkless type is shown in Figs. 9 to 12, this including all of the parts shown in Figs. 1 to 3, and already described, with the exception of the supporting elements 15, 15, the screws 8, 8 and the cabinet end wall 26.

When a switch such as shown in Figs. 9 to 12 is required I provide at each side two substitute supporting elements 80 and 81 which are identical respectively with the supporting elements 14 and 15 as concerns the supporting of the switch contacts 10 and 13 and as concerns their mounting on the supporting bars 4, 4. The two pairs of supporting elements 14, 15 and 80, 81 are therefore interchangeably usable and are adapted to be interchangeably mounted on the supporting bars. The elements 80 and 81 differ from the elements 14 and 15 in that they are adapted not only to support the said switch contacts 10 and 13 but are also adapted to serve for the attachment of a by-pass connection. For this purpose the two supporting elements are provided respectively with upward and downward extensions 82 and 83 which are preferably connected by an insulating strut 84 spaced from the said extensions by means of washers 85, 85. Screws 86, 86 extend through suitable holes in the strut through the washers and through threaded holes in the extensions 82 and 83. A by-pass link 87 shown by dot-and-dash lines in Fig. 12 may be used to connect the two extensions 82 and 83, this link being held in place by nuts on the screws 86, 86.

For the construction of a fused meter testing switch of the "linkless" type I also provide at each side a conductor element 88 which is adapted to be used interchangeably with the corresponding screw 8 for providing electrical connection with the corresponding upper fuse contact 2. For the switch shown in Figs. 9 to 12 the screw 8, heretofore described as forming an electrical connection between the fuse contact 2 and the coresponding supporting element 6, is omitted and the conductor 88 is used, this conductor being directly connected with the fuse contact 2 as clearly shown in the drawings. The conductor 88 occupies the before-mentioned groove 48 in the base, extending through the said opening 49. The conductor 88 is held in place by a screw 89 extending through the before-mentioned screw hole 50. The screw 89 serves not only to hold the conductor 88 but also to hold the fuse contact 2. Preferably the conductor 88 is mechanically connected with the before-mentioned strut 84 by means of a screw 90 which extends through a hole 91 in the conductor and into a threaded hole 92 in the strut. Thus the conductor 88 serves in conjunction with the strut 84 and associated parts to assist in holding the base 3 in place.

Two additional wire terminals 93 and 94 are provided at each side, the terminal 93 being carried by the conductor 88 and the terminal 94 being connected with the supporting element 6.

As fully set forth in my said Patent No. 1,757,743 a fused switch of the type disclosed is adapted to provide an electrical sequence of switch-fuse-meter-switch or an electrical sequence of switch-meter-fuse-switch. These two different sequences may be obtained by changing the electrical connections as fully described in the said application. Furthermore, the fuse base with the parts thereon is reversible, as also described in the said application, to make it possible for the service wires and the load wires to occupy preferred positions in the cabinet for either electrical sequence. In order that the construction shown in Figs. 9 to 12 may be more readily compared with the constructions shown respectively in Figs. 1 to 3 and in Figs. 6 to 8 I have shown the base in the same position with respect to the other parts; and I have shown wiring connections which provide an electrical sequence of switch-meter-fuse-switch. With the base in the position shown and with a desired sequence of switch-meter-fuse-switch the service wires S, S are connected with the terminals 19, 19 and the load wires L are connected with the terminals 18, 18. The meter connections C¹ and C² are connected respectively with the terminals 94, 94 and 93, 93. With the connections made as described the circuit extends from one service wire through the switch contacts 13, 21 and 12 to the corresponding terminal 94 and the meter connection C¹. From the meter connection C² and the terminal 93 the circuit extends through the conductor 88 to the fuse contact 2. From the other fuse contact 1 the circuit extends through the switch contacts 11, 20 and 10 to the load wire terminal 18. If desired nuts 77, 77 may be provided for the purpose already described in connection with Figs. 6 to 8. With the connections made as described, it will be observed that when the switch is operated the circuit is broken not only at both sides of the fuse but also at both sides of the meter. Thus when the circuit is broken in the usual way the meter terminals are electrically freed and ready for testing without the necessity for the manipulation of any additional test switch or test link. The switch thus serves in and of itself not only for normal switching purposes but also for meter testing purposes. It will be understood that when the meter is to be tested the before described by-pass links 87, 87 are first put in place on the extensions 82, 83 so as to provide direct by-pass connections from the service wires to the load wires.

Preferably the upper and lower screws which hold the several supporting elements in place on the bars 4, 4 are made longer than those shown in Figs. 1 to 3 these longer screws being represented at 7', 7' and 17', 17'. Nuts are provided on these longer screws and these nuts may serve either for the attachment of the usual leads connected with suitable testing instruments or they may serve for suitable switch by-pass links all as set forth in my said Patent No. 1,757,743.

It will be understood that for the construction shown in Figs. 8 to 12 a suitable substitute end wall is provided and this may be an end wall 26ª identical in construction with that shown in Figs. 6 to 8.

The front cover for the cabinet may be of the type shown in Figs. 1 to 3, or it may be of the type shown in Figs. 6 to 8, or it may be of a third type as shown in Figs. 9 to 12. Either of the first said cover constructions when used with a meter would prevent current theft by connection made at the fuse contacts; but, with the parts electrically connected as shown in Figs. 9 to 12 and as already described, the fuses are connected after the meter so that it is not essential, in so far as the prevention of current theft is concerned, to prohibit free access to the fuse contacts. In fact, it may be permissible to provide a cover 95 having an opening 96 therein similar to the opening 39 in the construction shown in Figs. 1 to 3. However, instead of providing an interlocked auxiliary cover for the opening 96 I have shown a plain flat cover 97 which is hinged to the main cover at 98 being normally held in closed position by means of a spring 99. The cover 97 makes it possible for access to be had to the fuses at any time but this does not permit theft of current for the reason that any current taken from the fuse contacts would first pass through the meter.

From the foregoing description it will be apparent that I have provided a system of manufacture for fused electric switches which makes it possible for the manufacturer, by providing a minimum variety of parts, to easily construct switches of three different types as desired. The majority of the parts in all three switches are identical in construction and such parts as are alternative in construction are interchangeably usable with the common parts.

What I claim is:

1. A system of manufacture for fused electric switches, comprising in combination, a rear insulating supporting means, an insulating fuse carrying base, means for supporting the base upon the supporting means at the front thereof and in normally fixed spaced relation thereto, a switching device located at least in part between the base and the supporting means, an optionally usable meter testing means separate from the said base, and two interchangeably usable supporting elements interchangeably connectible to the said rear supporting means, one of the said elements being constructed to support only a stationary contact of the switch device and the other being constructed not only to support such a stationary contact but also to at least partly support the said testing means.

2. A system of manufacture for fused electric switches, comprising in combination, a rear insulating supporting means, an insulating fuse carrying base, means for supporting the base upon the supporting means at the front thereof and in normally fixed spaced relation thereto, a switching device located at least in part between the base and the supporting means, an optionally usable meter testing means separate from the said base and comprising an insulating block with circuit interrupting means and by-pass attachment means thereon, and two interchangeably usable supporting elements interchangeably connectible to the said rear supporting means, one of the said elements being constructed to support only a stationary contact of the switch device and the other being constructed not only to support such a stationary contact but also to at least partly support the block of the said testing means.

3. A system of manufacture for fused electric switches, comprising in combination, a rear insulating supporting means, forward extending supporting elements secured to the said supporting means, an insulating fuse carrying base secured to the supporting elements, a switching device located at least in part between the base and the supporting means, the said device comprising two pairs of stationary contacts with one contact of each pair carried by a corresponding one of the said supporting elements and the said device also comprising a rectilinearly movable switching member guided between the supporting means and the base and including separate conducting elements arranged to engage and disengage the said stationary contacts, an optionally usable meter testing means separate from the said base, and two optionally interchangeably usable supporting elements additional to those aforesaid and interchangeably connectible to the supporting means, one of the said elements being constructed to support only a remaining stationary contact of the switch device and the other being constructed not only to support such a stationary contact but also to at least partly support the said testing means.

4. A system of manufacture for fused electric switches, comprising in combination, a rear insulating supporting means having at least one hole therein for a mounting screw, an insulating fuse carrying base, means for supporting the base upon the supporting means at the front thereof and in normally fixed spaced relation thereto, a switching device located at least in part between the base and the supporting means, an optionally usable meter testing means separate from the said base and comprising an insulating block with circuit interrupting means and by-pass attachment means thereon, an optionally usable strut adapted to be interposed between the meter testing means and the supporting means to at least partly support the former on the latter, and two interchangeably usable mounting screws of different lengths each adapted to extend through the hole in the supporting means to assist in holding the switch in place on a supporting wall, the shorter screw being usable when the testing means and strut are omitted and having its forward end directly engaging the supporting means and the longer screw being usable when the testing means and strut are used and having its forward end engaging the testing means.

5. A system of manufacture for fused electric switches, comprising in combination, a rear insulating supporting means having at least one hole therein for a mounting screw, an insulating fuse carrying base, means for supporting the base upon the supporting means at the front thereof and in normally fixed spaced relation thereto, a switching device located at least in part between the base and the supporting means, an optionally usable meter testing means separate from the said base and comprising an insulating block with circuit interrupting means and by-pass attachment means thereon, an optionally usable tubular strut adapted to be positioned in register with the said screw hole and interposed between the meter testing means and the supporting means to at least partly support the former on the latter, and two interchangeably usable mounting screws of different lengths each adapted to extend through the hole in the supporting means to assist in holding the switch in place on a supporting wall, the shorter screw being usable when the testing means and strut are omitted and having its forward end directly engaging the supporting means and the longer screw being usable when the testing means and strut are used and extending through the tubular strut with its forward end engaging the block of the said testing means.

6. A system of manufacture for fused electric switches, comprising in combination, a rear insulating supporting means, an insulating base, means for supporting the base upon the supporting means at the front thereof and in normally fixed spaced relation thereto, a pair of fuse contacts on the base, a switching device located at least in part between the base and the supporting means and comprising two pairs of stationary switch contacts and also comprising two movable switching elements for making and breaking connection between the contacts of the respective pairs, wire terminals electrically connected with some of the said switch contacts, means for electrically connecting a switch contact of one pair with one fuse contact, two interchangeably usable elements each adapted to be carried by the base in electrical connection with the remaining fuse contact, one serving to provide electrical connection with a stationary switch contact of the remaining pair and the other being free from electrical connection with the last said contact and serving for the attachment of an additional wire terminal, and two interchangeably usable pairs of supporting elements interchangeably connectible to the said rear supporting means, the elements of one pair being respectively constructed to support only stationary switch contacts of the respective pairs and the elements of the other pair being constructed not only to support such stationary switch contacts but also to serve for the attachment of a by-pass connection.

7. A system of manufacture for fused electric switches, comprising in combination, a rear insulating supporting means, forward extending supporting elements secured to the said supporting means, an insulating base secured to the supporting elements, a pair of fuse contacts on the base, a switching device located at least in part between the base and the supporting means, the said device comprising two pairs of stationary contacts with one contact of each pair carried by a corresponding one of the said supporting elements and the said device also comprising a rectilinearly movable switching member guided between the supporting means and the base and including separate conducting elements arranged to engage and disengage the said stationary contacts, wire terminals electrically connected with some of the said switch contacts, means for electrically connecting a switch contact of one pair with one fuse contact, two interchangeably usable elements each adapted to be carried by the base in electrical connection with the remaining fuse contact, one serving to provide electrical connection with a stationary switch contact of the remaining pair and the other being free from electrical connection with the last said contact and serving for the attachment of an additional wire terminal, and two interchangeably usable pairs of supporting elements additional to those aforesaid and interchangeably connectible to the said rear supporting means, the elements of one pair being respectively constructed to support only stationary switch contacts of the respective pairs and the elements of the other pair being constructed not only to support such stationary switch contacts but also to serve for the attachment of a by-pass connection.

8. A system of manufacture for fused electric switches, comprising in combination, a rear insulating supporting means, an insulating base, means for supporting the base upon the supporting means at the front thereof and in normally fixed spaced relation thereto, a pair of fuse contacts on the base, a switching device located at least in part between the base and the supporting means and comprising two pairs of stationary switch contacts and also comprising movable switching elements for making and breaking connection between the contacts of the respective pairs, an optionally usable meter testing means separate from the said base, and three interchangeably usable supporting elements interchangeably connectible to the said rear supporting means, the first element being constructed to support only a stationary contact of the said switch, the second element being constructed not only to support such a stationary switch contact but also to at least partly support the said testing means, and the third element being constructed not only to support such a stationary switch contact but also to serve for the attachment of a by-pass connection.

9. A system of manufacture for fused electric switches, comprising in combination, a rear insulating supporting means, an insulating base, means for supporting means at the front thereof and in normally fixed spaced relation thereto, a pair of fuse contacts on the base, a switching device located at least in part between the base and the supporting means and comprising two pairs of stationary switch contacts and also comprising movable switching elements for making and breaking connection between the contacts of the respective pairs, wire terminals electrically connected with some of the said switch contacts, means for electrically connecting a switch contact of one pair with one fuse contact, two interchangeably usable elements each adapted to be carried by the base in electrical connection with the remaining fuse contact, one serving to provide electrical connection with a stationary switch contact of the remaining pair and the other being free from electrical connection with the last said contact and serving for the attachment of an additional wire terminal, an optionally usable meter testing means separate from the said base, and three interchangeably usable supporting elements interchangeably connectible to the said rear supporting means, the first element being constructed to support only a stationary contact of the said switch, the second element being constructed not only to support such a stationary switch contact but also to at least partly support the said testing means, and the third element being constructed not only to support such a stationary switch contact but also to serve for the attachment of a by-pass connection.

10. A system of manufacture for fused electric switches, comprising in combination, a rear insulating supporting means, forward extending supporting elements secured to the said supporting means, an insulating base secured to the supporting elements, a pair of fuse contacts on the base, a switching device located at least in part between the base and the supporting means, the said device comprising two pairs of stationary contacts with one contact of each pair carried by a corresponding one of the said supporting elements and the said device also comprising a rectilinearly movable switching member guided between the supporting means and the base and including separate conducting elements arranged to engage and disengage the said stationary contacts, wire terminals electrically connected with some of the said switch contacts, means for electrically connecting a switch contact of one pair with one fuse contact, two interchangeably usable elements each adapted to be carried by the base in electrical connection with the remaining fuse contact, one serving to provide electrical connection with a stationary switch contact of the remaining pair and the other being free from electrical connection with the last said contact and serving for the attachment of an additional wire terminal, an optionally usable meter testing means separate from the said base and comprising an insulating block with circuit interrupting means and by-pass attachment means thereon, and three interchangeably usable supporting elements interchangeably connectible to the said rear supporting means, the first element being constructed to support only a stationary contact of the said switch, the second element being constructed not only to support such a stationary switch contact but also to at least partly support the block of the said testing means, and the third element being constructed not only to support such a stationary switch contact but also to serve for the attachment of a by-pass connection.

In testimony whereof I have hereunto set my hand this 23rd day of January, 1928.

JOSEPH SACHS.